United States Patent [19]

Hashimoto

[11] Patent Number: 5,118,276
[45] Date of Patent: Jun. 2, 1992

[54] CUTTING AND SORTING UNIT IN USE FOR SYNTHETIC RESIN CONTINUOUS MOLDING MACHINE

[75] Inventor: Kentaro Hashimoto, Tokyo, Japan

[73] Assignee: Tokyo Glass Seiki Kabushiki Kaisha, Tokyo, Japan

[21] Appl. No.: 616,080

[22] Filed: Nov. 20, 1990

[51] Int. Cl.⁵ .............................................. B29C 49/72
[52] U.S. Cl. .................................. 425/289; 225/100; 264/150; 264/159; 264/161; 264/536; 425/527; 425/806
[58] Field of Search ............... 425/527, 289, 531, 306, 425/307, 363, 806; 83/175, 569, 663, 673; 264/175, 161, 536, 148, 160, 150, 159; 225/97, 100

[56] References Cited

U.S. PATENT DOCUMENTS

| | | | |
|---|---|---|---|
| 3,010,630 | 11/1961 | Lach et al. | 225/100 |
| 3,724,980 | 4/1973 | Lassmann et al. | 425/306 X |
| 3,986,807 | 10/1976 | Takegami et al. | 425/307 |
| 3,994,651 | 11/1976 | Kamibayashi | 425/527 X |
| 4,340,342 | 7/1982 | Kim | 425/307 X |
| 4,370,124 | 1/1983 | Buja | 425/289 X |
| 4,529,114 | 7/1985 | Casper et al. | 225/100 |
| 4,731,008 | 3/1988 | Hayashi et al. | 425/363 X |
| 4,865,675 | 9/1989 | Yamamoto et al. | 425/363 X |

Primary Examiner—Richard L. Chiesa
Attorney, Agent, or Firm—Oblon, Spivak, McClelland, Maier & Neustadt

[57] ABSTRACT

A series of driven rolls for separating blow-molded products from segments of flash material in a string of products formed in a synthetic resin continuous molding machine. A first pair of rolls receives a string of products joined by flashes as the products are removed from the dies of a blow-molding apparatus. At least one of the rolls in the first pair of rolls is driven at a first rotational speed. An intermediate pair of rolls receives the string of products and flashes from the first pair of rolls, and the intermediate rolls are driven at a speed faster than the first rotational speed to stretch the string of products and thereby separate the flashing segments from the products. A pair of last rolls is spaced by an interval from the pair of intermediate rolls. The interval between the intermediate rolls and the last rolls is adjusted such that the products and the flashes can be sorted by length. The longer of the products and flashes are advanced through the pair of last rolls, whereas the shorter of the products and flashes drop through the interval between the rolls, thereby sorting the blow-molded products from the flash segments. Preferably, the distance between the pairs of rolls is adjustable to accommodate strings of products and flash segments of various configurations. Additionally, the last rolls are preferably driven at a speed faster than the intermediate pair of rolls to facilitate cutting and to quicken the advancement of material by the last rolls.

10 Claims, 4 Drawing Sheets

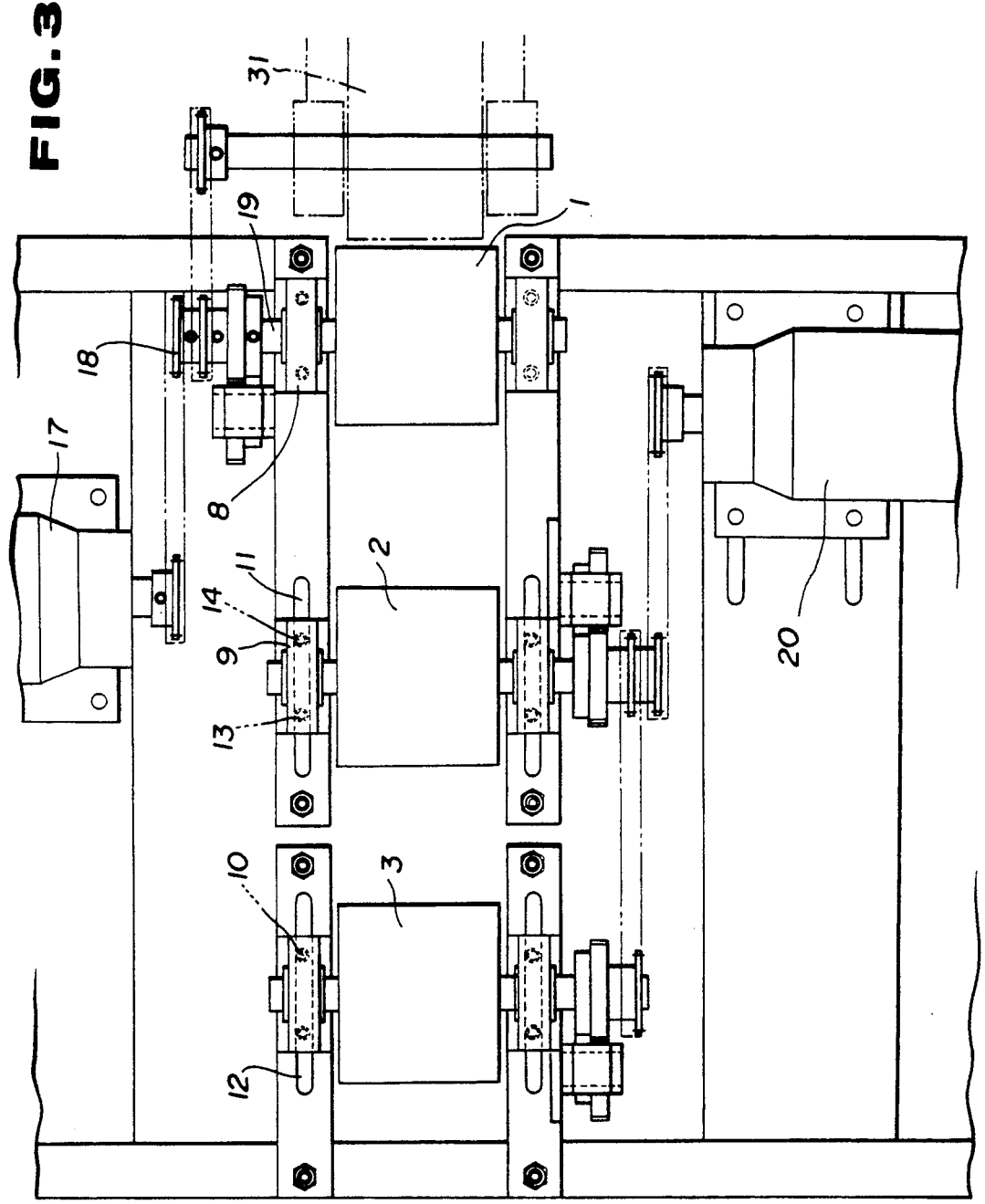

CUTTING AND SORTING UNIT IN USE FOR SYNTHETIC RESIN CONTINUOUS MOLDING MACHINE

FIELD OF THE INVENTION

The present invention relates to improvements in a continuous cutting unit, in use for a continuous molding machine, capable of cutting piece by piece products being fed out from the continuous molding machine or cutting lines between flashes and the products.

BACKGROUND OF THE INVENTION

The inventor invented previously the continuous molding machine called "Rotary Machine", which enjoyed popularity.

The rotary machine, having a plurality of pairs of dies disposed along its peripheral face, introduces tubular resin material between a pair of dies, closes the dies, and utilizes needles and the like for injecting air into the tubular material in the dies during the middle course of a circumferential movement of the dies, thereby inflating the resin material to obtain finished products.

In that case, a part between the products or between the product and the flash is preferably extremely thin, in other words, is easy to cut.

Thus, a string of continuous products, or a string of continuous flashes between the products is produced.

For this reason, it becomes needed to cut or separate the string.

PRIOR ART AND ITS DRAWBACK

Ordinarily, a means of cutting or separating the part between the products or flashes from the conventional string, arranging groups of pairs of rolls with the specified interval left between them, makes rotational speed of a pair of roll close to the outlet side relatively faster than that of a pair of roll close to the inlet side, thereby stretching the products. At that time, as mentioned above, since the parts between the products and the parts between the flashes and the products are extremely thin, each of them is cut or separated therefrom.

The flashes and the producted both of which has been cut are transfered onto a pair of conveyors being horizontally provided with the specified interval left between them. Such an interval is shorter than the length of the products, being longer than the length of the flashes.

Namely, the products cross the interval between both the conveyor and are taken from the machine after being traversed by the continued conveyors, while the flashes are dropped from the interval to be scrapped. An arrangement is also accepted in which the length of the products is shorter than that of interval and the length of the flashes is also shorter than that of the intervals.

Therefore, such a conventional unit is, as a whole, large, making of the same being more costly, and requires a wide range as a space on which it is to be installed. A diversity in the length of the products and the flashes is subject to the products and, whenever such a length is changed, a large altering works including the interval adjustments between the rolls and between the conveyors and the like become needed.

PURPOSE OF THE INVENTION

The purpose of the present invention is to provide improvements in the continuous cutting unit in which the unit is made compact, the cutting and sorting processes of the products and the flashes may be assuredly performed, a change in the length of the flashes can accompany a possibility of adjusting easily the interval between rolls and the products can be easily taken out after being cut and sorted.

CHARACTERISTICS AND ACTING EFFECT OF THE INVENTION

One of characteristics of the present invention lies in a full miniaturization of the mechanism of the unit, which can be fulfilled by centralizing the cutting and sorting processes, being conventionally separated, into the one mechanism.

Namely, the foregoing characteristics may be specified to be in an arrangement in which among 3 groups of pairs of rolls, disposed in a flowing direction of a string of continuous products, which have been molded together with the flashes by the continuous molding machine through the processes of introducing first the tubular synthetic resin material into a pair of dies, subsequently closing the dies, and injecting the air into the resin material in the dies, a pair of intermediate rolls are made to be faster in rotational speed in comparison with a pair of rolls located at the forefront.

Under such an arrangement, a string of products and flashes, fed out from the dies, is interposed between a pair of rolls located at the forefront, and is held between a pair rolls of intermediate rolls. At that time, since a pair of intermediate rolls are faster in rotational speed than a pair of rolls located at the forefront, the cutting process is to be performed under a state where a part of connecting the product and the flash to each other is being stretched.

The cutting process can be easily facilitated, because the part between the products or the part between the product and the flash becomes thin enough to be easily cut.

Another characteristics has at least one interval between a pair of intermediate rolls and a pair of last rolls fabricated to be a little longer than the length of the product or the flash which is shorter than those of the reminder.

Under such an arrangement, assuming that the product is longer than the flash, while the product is led in a direction of the last rolls, the flash results in dropping down from the interval therebetween, so a sorting between the product and the flash may be realized. Conversely, if the product is shorter than the flash, while the flash is led in a direction of the last rolls, the product results in dropping down from the interval. That enables a sorting between the product and the flash as well.

A further characteristics is attained by a provision of an adjusting mechanism capable of adjusting the length of an interval between a pair of rolls located at the forefront and a pair of intermediate rolls, or between a pair of intermediate rolls and a pair of last rolls, or the intervals between both groups of pairs thereof.

Namely, such as attained possibility of adjusting easily the intervals between the rolls in response to the length of the product or the flash can sort the product and the flash without compelling the sortable mode to be subject to a change in the length thereof.

A still further characteristic lies in an additional arrangement in which a pair of last rolls is made to be faster in rotational speed in comparison with a pair of intermediate rolls.

Namely, such an arrangement of making the last rolls to be faster in rotational speed brings a state of spring the product and the like from the molding machine to reality, thereby facilitating a take-out of the product, while even if the product fails to be cut by the fromer groups of rolls, the last roll ensures the product and the like to be cut in a manner of biting it off.

BRIEF DESCRIPTION OF THE DRAWINGS

The other characteristics, advantageousness, or brilliant acting effect of the present invention will be apparent from the following detailed description of the embodiment thereof:

FIG. 3 is a plan exaplanatory view of FIG. 2.

DETAILED DESCRIPTION OF THE PREFERRED EMOBDIMENTS

Figure 1:
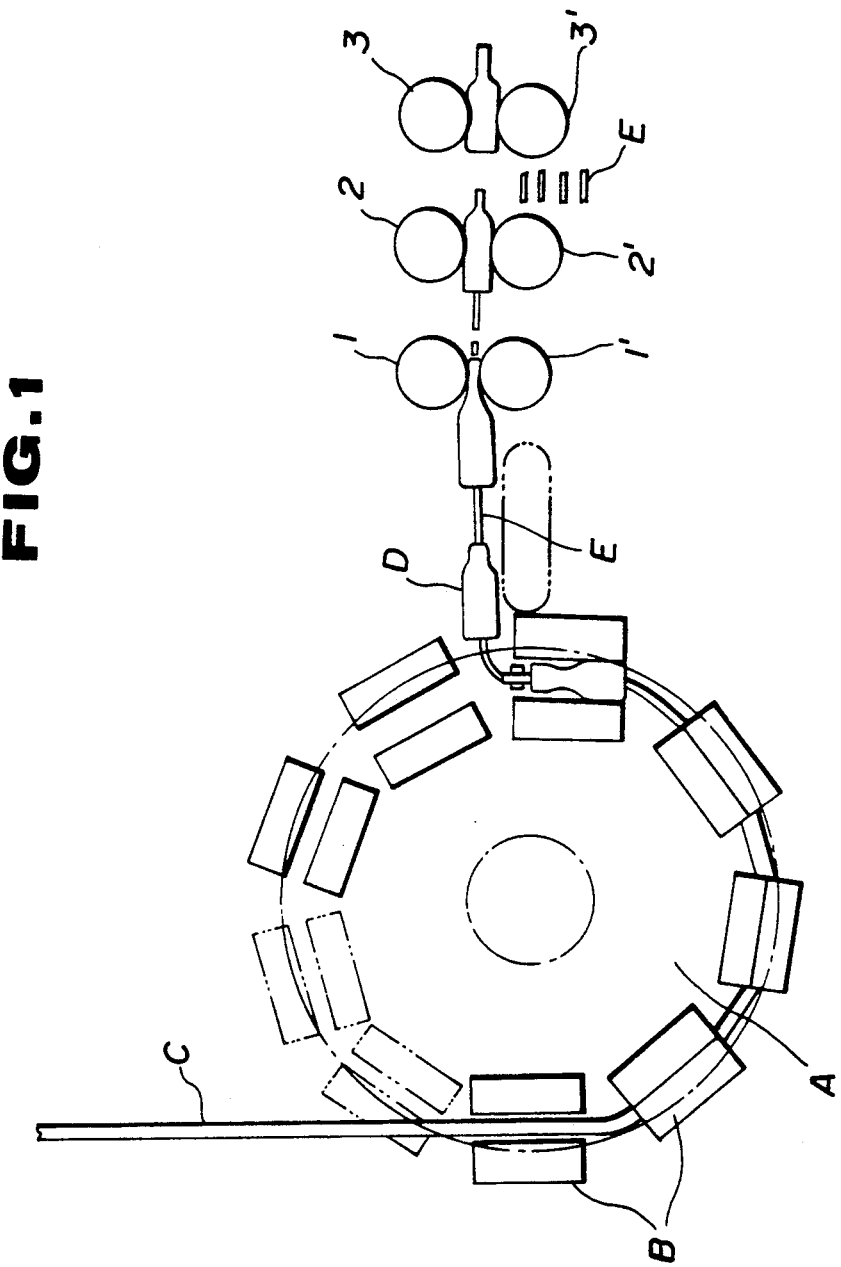
FIG. 1 is a front explanatory view of an entire part of the unit.

Referring to FIG. 1 (A) is an example of the rotary type continuous molding machine. The molding machine has a plurality of pairs of dies (B) disposed radially on the peripheral face thereof. (C) is the tubular sythetic resin material, being introduced into a pair of dies (B), which is closed, and the air is injected into the material (C) in the dies (B) by the publicly known method.

Further to the foregoing process, the resin material (C), molded in the dies, is cooled and taken out from the dies (B). In the illustrated example, a string of the products (D) and the flashes (E) between the products (D), ranging continuously from one to another, is fed out.

(1) and (1)', (2) and (2)', and (3) and (3)' are the rolls located at the forefront, the intermdiate rolls, and the last rolls respectively, which are provided in a flowing direction of a string of products (D) and flashes (E) being continuously fed out with the intervals left between these rolls.

Figure 2:
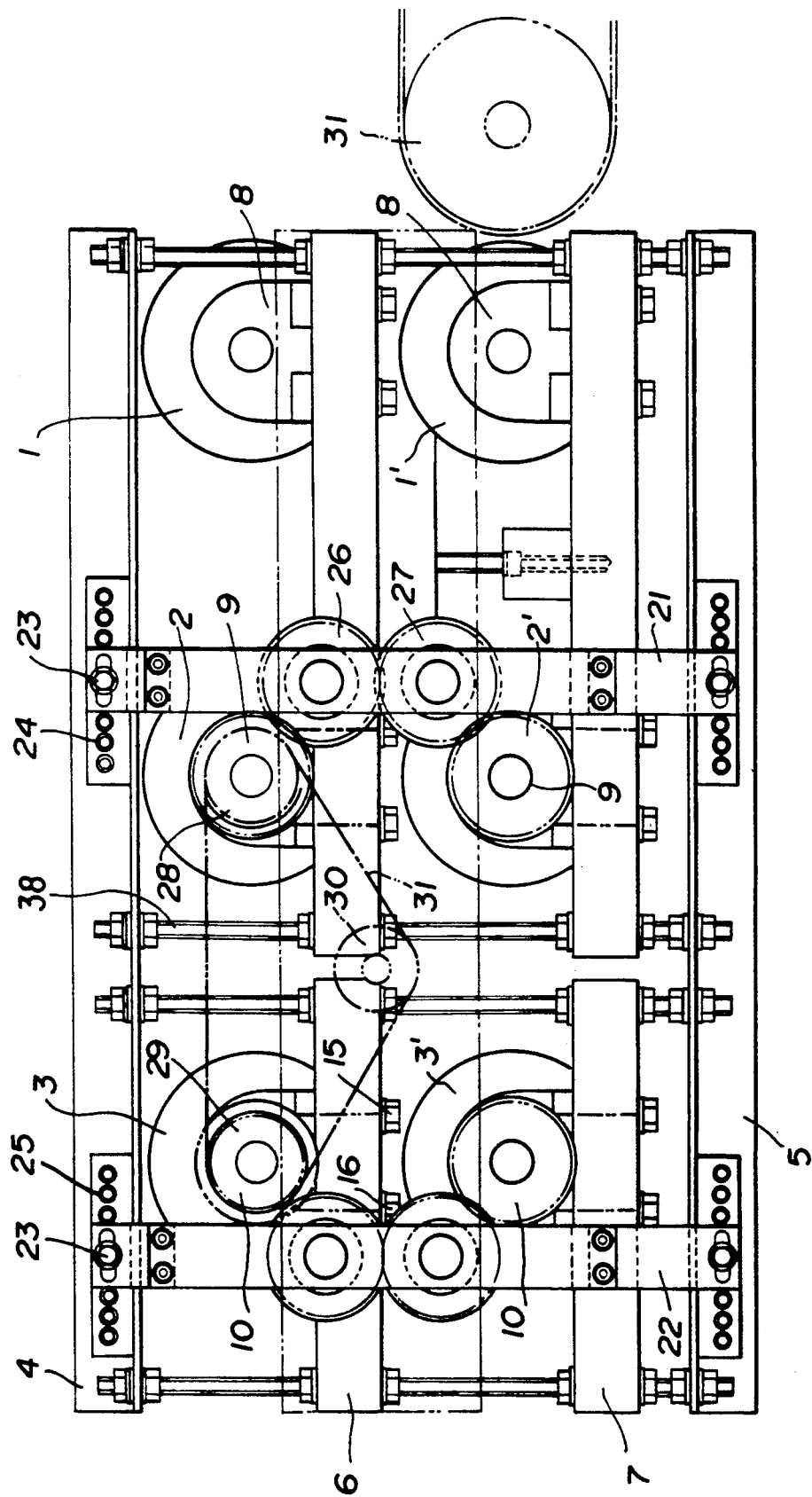
FIG. 2 is also a front explanatory view of the entire part of the unit of the present invention.

Referring now to FIGS. 2 and 3, wherein the entire part of the unit is illustrated. (4) and (5) are upper and lower frames, horizontally parallel with each other, which are fixed to fixing yokes (not shown). A plurality of vertical rods (38) permit sub-frames (6) and (7), also horizontally parallel with each other, to be fixed to the part between the frames (4) and (5). 3 groups of pairs of upper and lower bearing (8), (9), and (10), separated from one another with the specific intervals left therebetween, are provided onto the sub frame (6) and (7) respectively.

Among these bearings (8), (9), (10), supporting shafts of the foregoing pairs of rolls located at the forefront (1) and (1)', intermediate rolls (2) and (2)', and the last rolls (3) and (3)', the bearing (8) supporting the rolls located at the forefront (1) and (1)' is fixed to the sub-frame (6) and (7), when providing the bearings (8), (9), (10).

As for the bearings (9) and (10) supporting the intermediate rolls (2) and (2)' and the last rolls (3) and (3)' respectively, bolts (13) and (14) having their upper ends fixed to the bearings (9) and (10) are passed through the holes (11) and (12) being made just under the bearings (9) and (10), and fixed to the sub-frame (6) and (7), screwing up nuts (15) and (16) around the bolts (13) and (14) after setting first the nuts (15) and (16) to the area, slightly projecting down from the holes (11) and (12), of the bolts (13) and (14).

(17) is a motor, fixed to an adequate position in the frame (not shown), which drives the roll located at the forefront 1, being mechanically connected through a reduction gear (18) to the shaft (19) of the roll located at the forefront 1.

(20) is also a motor, provided slidably in an adequate place in the frame, which is mechanically connected to the shaft of the intermediate roll (2) and (2)' and the last rolls (3) and (3)'.

(21) and (22) are supporting plates, disposed outward perpendicular to the intermediate bearing (9) and the last bearing (10) respectively whose upper and lower ends are fixed to the upper and lower frames (4) and (5), screwing the nuts around the bolts (23) provided through the frames (4) and (5).

Groups of a plurality of transparent holes (24) and (25), made in the frames (4) and (5) in their lengthwise directions, are large enough to have to bolts (23) inserted therethrough.

The supporting plates (21) and (22) are equipped with a pair of gears (26) and (27) being in mesh with each other, which are further engaged with the gears provided around the shafts of the intermediate rolls (2) and (2)' and the last rolls (3) and (3)' respectively.

Sprockets (28) and (29) are provided around the shafts of the intermediate roll (2) and the last roll (3) each of which constitutes upper one of pairs of rolls. A chain (31) is stretched through a tension pulley (30) between those sprockets (28) and (29) as shown by a dashed line so that rotational force may be transmitted between the sprockets (28) and (29). Furthermore, a number of teeth of the sprocket (29) is constructed to be less than that of the sprocket (28), resulting in a faster rotation of the sprocket (29) than the sprocket (28).

(31) is a conveyor for traversing a string of products and semi-finished products which are fed out from the dies (B). Its one end is located at the feedingout part of the die (B), while another opposite end is located in vicinity of area between the rolls located at the forefront (1) and (1)'.

The length of each of intervals between the rolls located at the forefront (1) and (1)' and the intermediate rolls (2) and (2)' and between the intermediate rolls (2) and (2)' and the last rolls (3) and (3)' is shorter than the length of product (D), being longer than the length of the flash (E).

A required construction, electrical or mechanical, is that the rotational speed of the roll located at the forefront (1) is slower than those of the intermediate rolls (2) and (2)' and the last rolls (3) and (3)', the rotational speed of the intermediate rolls (2) and (2)' being also slower than that of the last rolls (3) and (3)'.

DESCRIPTION OF ACTING EFFECT OF THE EMBODIMENT

A description of acting effect of the embodiment according to the present invention is made as follows:

A drive force generated by the motor (17) is transmitted through the reduction gear (18) to the shaft (19) of the roll located at the forefront (1), which is rotated at a slower speed than the rotational speed of other rolls (2) and (2)', (3) and (3)'.

Furthermore, the motor (17), connected mechanically to the shaft (not shown) of the conveyor (31), has its rotational force associated with driving the conveyor. In that case, the rotational speed of the roll located at the forefront (1) and (1)' is equal to that of the conveyor (31).

In the present illustrated embodiment, the roll (1)' being lower than the roll (1) is not compelled to be driven but follows a flow of the product or the flash. Another arrangement may be accepted in which the roll (1)' is compelled to be driven at the speed identical to the rotational speed of the roll (1).

The rotational force generated by the motor (20) is transmitted to the shaft of the intermediate and upper roll (2), thereby rotating the roll (2). Such a rotational force is also transmitted through the chain (31), being stretched by way of the tension pulley (30) between the sprockets (28) and (29) to the last and upper roll (3), thereby rotating the roll (3).

It is as mentioned above that the roll (3) is faster in rotational speed than the roll (2).

As a result of engaging gears provided around the shafts of the intermediate and upper roll (2) and the last and upper roll (3) with gears (26) provided around the supporting plates (21) and (22) and having the gears (26) and the gears (27) in mesh with the gears (26) interacted, interlockings between the intermediate and upper roll (2) and the intermediate and lower roll (2)' and between the last and upper roll (3) and the last and lower roll (3)' take place, whereby the rolls (2)' and (3)' are rotated at the speed equal to the rotational speed of the roll (2) and (3) respectively. Assuming that a string of products (D) and flashes (E) which has been consecutively fed out from the dies (B) is going to lead the product (D) into the area between the intermediate rolls (2) and (2)' after being introduced into the area between the rolls located at the forefront (1) and (1)'.

Figure 4A:
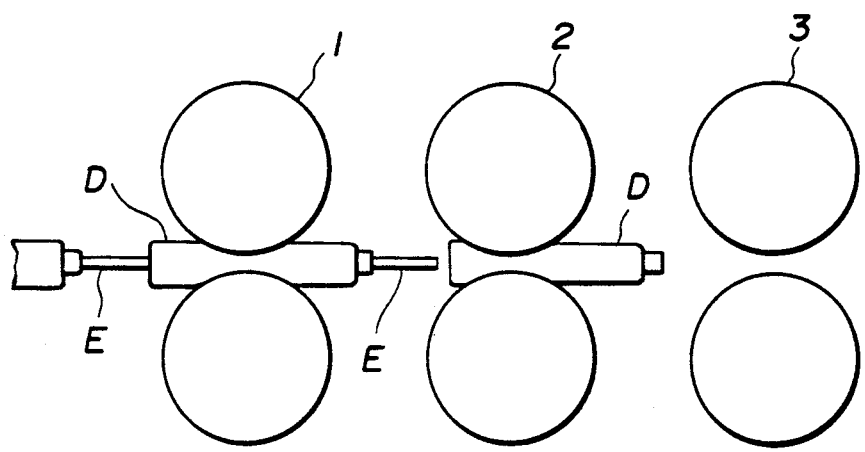
FIGS. 4(a) 4 (b) are schematic views illustrating stages of cutting and sorting of products and flashes by the invention.
Figure 4B:
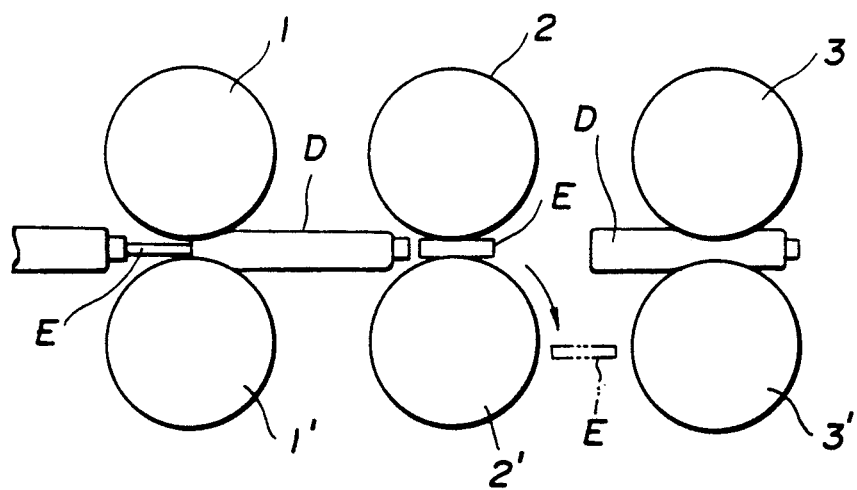

At that time, since the intermediate rolls (2) and (2)' are faster in rotational speed than the rolls located at the forefront (1) and (1)' (usually 3 times faster), a degree of stretching the product (D) is high enough to cut the product (D) and the flash (E) from each other as shown in FIG. 4(a). Subsequently, the intermediate rolls (2) and (2)' bite the flash (E) as shown in FIG. 4(b) and a cutting of the connecting part between the flash (E) and the following product (D) is completed. After that the product (D) and the flash (E) make advance toward the area between the last rolls (3) and (3)'. At that time, since the interval between the last rolls (3) and (3)' and the intermediate rolls (2) and (2)' is set to be shorter than the length of the product (D), being longer than the length of the flash (E), the last rolls (3) and (3)' can bite the product (D), while the flash (E) is dropped from the interval between the rolls (2) and (2)' and the rolls (3) and (3)' as illustrated by the phantom lines in FIG. 4(b).

Thus, the cutting and the sorting of the product (D) and the flash (E) become easily possible. The rotational speed of the last rolls (3) and (3)' is faster than that of the intermediate rolls (2) and (2)'.

That is intended to facilitate not only the cutting process of the product (D) and the flash (E) by the forgoing action, when the product (D) and the flash (E) are still connected to each other, even if their string has completed to be passed through the cutting process made by the intermediate rolls (2) and (2)', but also a quick feeding of the product (D) to the subsequent process.

Assuming the either of the product (D) or the flash (E) is longer or shorter or both of them are longer or shorter in comparison with such states as shown in FIGS. 1 and 2, in other words, assuming that the interval between the intermediate rolls (2) and (2)' and the last rolls (3) and (3)' is requested to be changed, it meets requirements that bolts (23) for either of the supporting plates (21) or (22) or for both of them is/are taken away, they are slided and adequate ones of a multiplicity of transparent holes (24) and (25) provided in the frame (4) and (5) are selected, refixing them to the frame (4) and (5).

Namely, if the distance to be changed, in other words, the length of either of the product (D) or the flash (E) is not changed to much extent, it may be satisfactory only to slide either of the supporting plates (21) or (22), while such a change is very large, it is required, to slide both of them.

In that case, since the chain (31) acting as a means of transmitting the rotational force between the sprocket (28) of the intermediate roll (2) and the sprocket (29) of the last roll (3) has the tension pulley (30) provided on its middle part, there may be no apprehension of making transmittance of the rotational force impossible.

Subsequently, the bolts (13) and (14) for either of the bearing (9) of the intermediate rolls (2) and (2)' or the bearing (10) of the last rolls (3) and (3)' for both of them are loosened, they are slided along the long holes (11) and (12) provided in the sub-frames (6) and (7), and the gears provided on the shafts of the bearings (9) and (10) become in mesh with the gears (26) and (27) of the supporting plates (21) and (22), thereby making it possible to adjust adequately the intervals among the rolls (1), (2), and (3).

It is required to slide the motor (20) as well by an adequate means by a distance identical to that of sliding the bearing (10) of the intermediate rolls (2) and (2)', when making such a sliding of the bearing (10) thereof.

Although the present illustrated embodiment exemplifies simply that the rolls (2) and (2)' and the rolls (3) and (3)' are slided, any construction may be accepted in which the distances between the rolls (2) and (2)' and between (3) and (3)' are adjustable.

I claim:

1. A synthetic resin continuous molding machine comprising:

a set of dies for receiving a tubular synthetic resin material therebetween, said dies being positioned to shape segments of the tubular synthetic resin material into finished products, thereby forming a string of products joined to one another by flashes;

a frame assembly having an intermediate support plate mounted thereon;

a first pair of rolls located at the forefront of said frame assembly for receiving said string of products and flashes;

means for rotating at least one roll of said first pair of rolls at a first rotational speed;

a pair of intermediate rolls receiving said string of products and flashes from said first pair of rolls;

means for rotating at least one roll of said pair of intermediate rolls at a speed faster than said first rotational speed, thereby stretching said string of products to separate said flashes from said products;

a pair of intermediate gears rotatably mounted on said intermediate support plate for drivingly interconnecting said pair of intermediate rolls with one another; and a pair of last rolls spaced from said pair of intermediate rolls for receiving either said products or said flashes;

and means for adjusting a distance between said first pair of rolls and said pair of intermediate rolls independently of a distance between said intermediate plate and said first pair of rolls.

2. A synthetic resin continuous molding machine according to claim 1, wherein either said products are longer than said flashes or said flashes are longer than said products such that a longer one of said products and said flashes is received by said pair of last rolls and such that a shorter one of said products and said flashes drops through an interval between said intermediate rolls and said last rolls to sort said products from said flashes.

3. A synthetic resin continuous molding machine as defined in claim 1, further comprising means for adjusting a length of an interval between said pair of intermediate rolls and said pair of last rolls.

4. A synthetic resin continuous molding machine as defined in any of claims 1-3, further comprising means for driving said pair of last rolls relatively faster in rotational speed than said pair of intermediate rolls.

5. A synthetic resin continuous molding machine according to claim 1, further comprising:
a last plate provided on said frame assembly, wherein a distance between said last plate and said intermediate rolls is adjustable independently of a distance between said last rolls and said intermediate rolls.

6. A cutting and sorting unit for separating molded products from flashes as a product string is advanced through the unit, comprising:
a frame;
a first pair of rolls rotatably supported by said frame;
means for rotating at least one roll of said first pair of rolls at a first rotational speed;
a pair of intermediate rolls rotatably supported by said frame and mounted so as to be movable to adjust the length of an interval between said first pair of rolls and said pair of intermediate rolls;

a pair of last rolls rotatably supported by said frame and mounted so as to be movable to adjust a length of an interval between said pair of intermediate rolls and said pair of last rolls;
means for rotating at least one of said intermediate rolls and at least one of said last rolls at a faster speed than said first rotational speed such that flashes are pulled apart from said molded products as the product string is advanced through the unit;
a pair of last gears for drivingly interconnecting said pair of last rolls, and means for adjusting a distance between said last gears and said intermediate pair of rolls independently of a distance between said last rolls and said intermediate pair of rolls.

7. A cutting and sorting unit according to claim 6, wherein said means for rotating at least one of said intermediate rolls and at least one of said last rolls includes an intermediate sprocket around one of said intermediate rolls and a last sprocket around one of said last rolls.

8. A cutting and sorting unit according to claim 7, further comprising a chain engaged with said intermediate sprocket and with said last sprocket, wherein said intermediate sprocket has a plurality of teeth and wherein said last sprocket has fewer teeth than said intermediate sprocket such that said at least one of said last rolls is driven at a speed faster than the speed of said at least one of said intermediate rolls.

9. A cutting and sorting unit according to claim 8, wherein said intermediate rolls are drivingly interconnected by a pair of intermediate gears such that both of said intermediate rolls are driven.

10. A cutting and sorting unit according to claim 9, wherein a distance between said intermediate gears and said first pair of rolls is adjustable independently of a distance between said intermediate rolls and said first pair of rolls.

* * * * *